United States Patent [19]
Pan et al.

[11] Patent Number: 5,644,520
[45] Date of Patent: Jul. 1, 1997

[54] ACCUMULATOR CIRCUIT AND METHOD OF USE THEREOF

[76] Inventors: Shao Wei Pan, 1931 Prairie Sq., Ste. 202, Schaumburg, Ill. 60173; Shay-Ping T. Wang, 1701 Edgewood La., Long Grove, Ill. 60047

[21] Appl. No.: 455,927

[22] Filed: May 31, 1995

[51] Int. Cl.$^6$ .................................. G06F 7/38; G06F 7/52
[52] U.S. Cl. ................. 364/736.01; 364/759; 395/800
[58] Field of Search .............................. 364/736, 750.5, 364/751, 758, 759, 760, 768, 778–786; 395/27, 800

[56] References Cited

U.S. PATENT DOCUMENTS

| | | | |
|---|---|---|---|
| 3,551,663 | 12/1970 | Herron et al. | 235/159 |
| 3,748,451 | 7/1973 | Ingwersen | 364/728.01 |
| 3,922,536 | 11/1975 | Hampel et al. | 364/735 |
| 3,941,990 | 3/1976 | Rabasse | 364/785 |
| 3,967,100 | 6/1976 | Shimomura | 364/735 |
| 4,156,922 | 5/1979 | Majerski et al. | 364/757 |
| 4,626,825 | 12/1986 | Burleson et al. | 341/75 |
| 4,905,143 | 2/1990 | Takahashi et al. | 395/800 |
| 4,949,292 | 8/1990 | Hoshino et al. | 364/736 |
| 5,042,001 | 8/1991 | Brightman et al. | 364/736 |
| 5,068,816 | 11/1991 | Noetzel | 364/718 |
| 5,073,867 | 12/1991 | Murphy et al. | 395/27 |
| 5,195,050 | 3/1993 | Hsu et al. | 364/728.01 |
| 5,220,559 | 6/1993 | Tsuzuki et al. | 370/60 |
| 5,278,945 | 1/1994 | Basehore et al. | 395/27 |
| 5,343,254 | 8/1994 | Wada et al. | 348/627 |
| 5,426,598 | 6/1995 | Hagihara | 364/759 |
| 5,440,721 | 8/1995 | Morgan et al. | 364/736 |

FOREIGN PATENT DOCUMENTS

| | | | |
|---|---|---|---|
| A3 0/218/971 | 9/1986 | European Pat. Off. | G06F 7/552 |
| WO87/07053 | 11/1987 | WIPO | G06F 7/552 |
| WO93/17383 | 9/1993 | WIPO | G06F 7/52 |

OTHER PUBLICATIONS

A Logarithmic Vector Processor for Neural Net Applications by Steve Richfield, Neurosoft, IEEE First International Conference on Neural Networks, Sheraton Harbor Island East, San Diego, California, Jun. 21–24, 1987.

A Multiplier–Less Digital Neural Network by L. Spaaneburg, B. Hoefflinger, S. Neusser, J.A.G. Nijhuis, A. Siggelkow, IMS, Stuttgart, Germany, Proceedings of the 2nd Int'l Conference on Microelectronics for Neural Networks, Oct. 16–18, 1991, Munich, F.R. Germany pp. 281–289.

Algorithm Design for a 30 bit Integrated Logarithmic Processor by David M. Lewis and Lawrence K. Yu, Department of Electrical Engineering, University of Toronto, Proceeding 9th Symposium on Computer Arithmetic, 1989, IEEE Comp. Soc. Press, pp. 192–199.

An Architecture for Addition and Subtraction of Long Word Length Numbers in the Logarithmic Number System by David M. Lewis, Member, IEEE, IEEE Transactions on Computers, vol. 39, No. 11. Nov. 1990, pp. 1325–1336.

A 30–b Integrated Logarithmic Number System Processor by Lawrence K. Yu, Member, IEEE, and David M. Lewis, Member, IEEE, IEEE Journal of Solid–State Circuits, vol. 26, No. 10, Oct. 1991, pp. 1433–1440.

(List continued on next page.)

Primary Examiner—Paul P. Gordon
Assistant Examiner—Emmanuel L. Moise
Attorney, Agent, or Firm—Michael K. Lindsey; Bruce E. Stuckman

[57] ABSTRACT

An accumulator is provided which includes a plurality of summing circuits, a plurality of switches, and a control unit for controlling the transmission of data generated by the summing circuits. Each summing circuit generates intermediate sums and includes a port for transmitting the intermediate sums. The switches are connected between the ports of the summing circuits. The control unit is programmable to operate the switches and enable the ports at various times, thus allowing the accumulator to be configured to perform any of a variety of summing operations.

31 Claims, 6 Drawing Sheets

OTHER PUBLICATIONS

An Accurate LNS Arithmetic Unit Using Interleaved Memory Function Interpolator by David M. Lewis, Department of Electrical Engineering, University of Toronto, Proceeding 11th Symposium on Computer Arithmetic, 1993, IEEE Comp. Soc. Press, pp. 2–9.

Interleaved Memory Function Interpolators with Application to an Accurate LNS Arithmetic Unit by David M. Lewis, Member, IEEE, IEEE Transactions on Computers, vol. 43, No. 8, Aug. 1994, pp. 974–982.

Table–Lookup Algorithms for Elementary Functions and Their Error Analysis by Ping Tak Peter Tang, Matematics and Computer Schience Division, Argonne National Laboratory, 9700 S. Cass Ave., Argonne, IL 60439–4801, Proceeding 10th Symposium on Computer Arithmetic, Jun. 1991, pp. 232–236.

Applying Features of IEEE 754 to Sign/Logarithm Arithmetic by Mark G. Arnold, Member, IEEE, Thomas A. Bailey, Member, IEEE, John R. Cowles, and Mark D. Winkel, IEEE Transactions on Computers, vol. 41, No. 8, Aug. 1992, pp. 1040–1050.

D8.13 Improved Accuracy for Logarithmic Addition in DSP Applications by Mark G. Arnold, John Cowles, and Thomas Bailey, Computer Science Department, University of Wyoming, Laramie, WY, ICASSP 88: Int. Conf. on Acoustics, Speech and Signal Processing, vol. 3 pp. 1714–1717 "No Date".

Redundant Logarithmic Number Systems by M.G. Arnold, T.A. Bailey, J.R. Cowles, J.J. Cupal, University of Wyoming, Laramie, WY, Proceeding of 9th Symposium on Computer Arithmetic, pp. 144–151, IEEE Comp. Soc. Press "No Date".

Comments on "An Architecture for Addition and Subtraction of Long Word Length Numbers in the Logarithmic Number System"[1] by M. Arnold, T. Bailey and J. Cowles, IEEE Transactions on Computers, vol. 41, No. 6, Jun. 1992, pp. 786–788.

Redundant Logarithmic Arithmetic, Mark G. Arnold, Member IEEE, Thomas A. Bailey, Member IEEE, John R. Cowles, and Jerry J. Cupal, Members IEEE, IEEE Transactions on Computers, vol. 39, No. 8, Aug. 1990, pp. 1077–1086.

The Efficient Implementation and Analysis of a Hybrid Number System Processor, Fang–shi Lai, IEEE Transactions on Circuits and Systems, II: Analog and Digital Signal Processing. vol. 40, No. 6, Jun. 1993, pp. 382–392.

Polynomial and Standard Higher Order Neural Network, Chir–Ho Chang, Jin–Ling Lin, and J.Y. Cheung, Electrical Engineering and Computer Science, University of Oklahoma, 1993 IEEE International Conference on Neural Networks, Mar. 28–Apr. 1, 1993, pp. 989–994.

A Digital Neuron–Type Processor and Its VLSI Design, Mahmoud K. Habib, Member, IEEE, and H. Akel, 8090 IEEE Transactions on Circuits and Systems 36(1989) May, No. 5, New York, US, pp. 739–746.

A Neural Feed–Forward Network with a Polynomial Non-linearity, Nils Hoffmann, Electronics Institute, Building 349, Technical University of Denmark, DK–2800 Lyngby, Denmark, Neural Networks for Signal Processing, Proceedings of the IEEE–SP Workshop, Aug. 31–Sep. 2, 199?, pp. 49–58.

A Polynomial time Algorithm for Generating Neural Networkes for Classification Problems, Asim Roy and Somnath Mukhopadhyay, Dept. of Decision and Information Systems, Arizona State University, IJCNN, 1992, 0–7803–0559–0/92 IEEE, pp. I–147—I–152.

Modeling systems with Polynomial Networks,Tools for Predicting Behavior, Peter D. Varhol, Programmer's Workbench, Dr. Dobb's Journal, Sep. 1993, Begins on p. 76.

AIM Outperforms Neural Networks and Regression, Mark Shewhart, USAF (IEEE Spectrum), AbTech Corporation, Charlotteville, VA 22903 "No Date".

Polynomial Functions Can Be Realized by Finite Size Multilayer Feedforward Neural Networks, Naohiro Toda, Ken–ichi Funahashi and Shiro Usui, Department of Information and Computer Sciences, Toyohashi University of Technology, Tempaku, Toyohashi 441, Japan, 1991 IEEE International Joint Conference on Neural Networks, vol. 1 of 3, The Westin Stamford and Westin Plaza, 18–21, Nov. 1991, Singapore.

An Artificial Neural Networks for Approximating Polynomial Functions, Behnam Malakooti and YingQing Zhou, Department of Ssytems Engineering, Center for Automation and Intelligent Systmes Research, Case Western Reserve University, Cleveland, Ohio, International Joint Conference on Neural Networks, Jun. 1992, pp. III–966—III–971.

Recursive Reduction in Finite Ring Computations, D. Zhang, G.A. Jullien, W.C. Miller, VLSI Research Group, Department of Electrical Engineering, University of Windsor, Windsor, Ontario Cananda N9B 3P4, Twenty–Third Asilomar conf. on Signals, systems and Computers, Conference Record vol. 2 of 2, pp. 854–857 "No Date".

Robot Kinematics Learning Computations Using Polynomial Neural Networks, C.L. Philip Chen and A.D. McAulay, Department of Computer Science and Engineering, Wright State University, Dayton, OH 45435, Proceedings of the 1991 IEEE, International Cof. on Robotics and Automation, Sacramento, CA, Apr. 1991, pp. 2638–2643.

Backpropagation Based on the Logarithmic Error Function and Elimination of Local Minima, Kiyotoshi Matsuoka and Jianqiang Yi, Department of Control Engineering, Kyushu Institute of Technology, Sensul 1–1. Tobata. Kitakyushu, 804 Japan, CH3065–0/91/0000–1117 IEEE, pp. 1117–1122 No Date.

Output Weight Optimization for the Multi–Layer Perceptron by M.T. Manry, Xiujun Guan, S.J. Apollo, L.S. Allen, W.D. Lyle, and W. Gong, Department of Electrical Engineering, University of Texas at Arlington, Arlington, Texas, Conference Record of the Twenty Sixth Asilomar conf. on Signals, Systems and Computers, Oct. 26–28, 1992, pp. 502–506.

Highly–automated, Non–parametric statistical learning for autonomous target recognition, Keith C. Drake, AbTech Corporation, 700 Harris Street, Charlottesville, Virginia 22903, pp. 1–10, Proceedings of the SPI 20th Applied Imagery Pattern Recognition Workshop, Oct. 1991, McLean, Virginia.

Generalization and Learning in Volterra and Radial Basis Function Networks: A Theoretical Analysis, Sean B. Holden and Peter J. W. Rayner, Cambridge University Engineering Department, Trumpington Street, Cambridge CB2 1PZ, U.K., 0–7803–0532–9/92, 1992 IEEE, pp. II–273—II–276.

On the Design Principles of the Functional Link Nets, Jun Wang and Edilberto P. Teixeira, Department of Systems Engineering, Case Western Reserve University, Cleveland, Ohio 44106, pp. 613–616, Ieee International Conf. on Systems Engineering, Aug. 9–11, 1990, Vista International Hotel, Pittsburgh, Pennsylvania, IEEE Catalog No.:90CH2872–0.

A Neural Network Systems Component, Dean Mueller and Dan Hammerstrom, Adaptive Solutions, Inc, 1400 NW Compton Drive Suite 340, Beaverton, Oregon 97006, pp. 1258–1264, Neural Networks, 1993 International Conference.

Parallel Coprocessor for Kohonen's Self–Organizing Neural Network, Jukka Saarinen, Martti Lindroos, Jouni Tomberg and Kimmo Kaski, Tampere University of Technology, Microelectronics Laboratory, P.O. Box 527, SF–33101 Tampere, Finland, pp. 537–542 Parallel Processing, 1992 Symposium.

-PRIOR ART-

-PRIOR ART-

ACCUMULATOR CIRCUIT AND METHOD OF USE THEREOF

RELATED INVENTIONS

The present invention is related to the following invention which is assigned to the same assignee as the present invention:

(1) "Computer Processor Utilizing Logarithmic Conversion and Method of Use Thereof", having Ser. No. 08/403, 158 filed on Mar. 13, 1995.

The subject matter of the above-identified related invention is hereby incorporated by reference into the disclosure of this invention.

TECHNICAL FIELD

The present invention relates generally to accumulators for summing numbers and, in particular, to an accumulator which is programmable to selectively sum numbers represented by input signals.

BACKGROUND OF THE INVENTION

An accumulator is an electronic circuit which is used to sum numerical data represented by signals. Typically, an accumulator receives two or more signals and then adds the signals together to form a sum. Accumulator circuits are used in a wide variety of applications. For instance, almost every computer ever built includes an accumulator.

Conventional accumulators include two different types of accumulators: serial accumulators and parallel accumulators. Both the serial and parallel accumulator provide the same basic function, that is, they both produce a sum by adding together a plurality of input signals. However, the serial and parallel accumulators differ in their structure and performance speed. The serial accumulator sums a sequence of input signals which are received over a period of time; whereas the parallel accumulator sums a plurality of input signal which are received simultaneously. In regard to circuit structure, the serial accumulator comprises an adder connected to a register; whereas the parallel accumulator comprises an adder tree connected to a register. The adder is a circuit which adds two signals together to produce a sum. The adder tree is a circuit which adds three or more signals together to produce a sum. The register is a memory circuit which stores the sum.

FIG. 1 shows a prior art serial accumulator circuit. The serial accumulator includes an adder 11 and a register 12. The serial accumulator receives a sequence of input signals, over time, on a first input 10. Also, the adder 11 receives a signal representing the sum stored in the register 12 on a feedback path 13. The adder 11 sums the signals received on the first input 10 and the feedback path 13 to produce a result which is then stored in the register 12. After receiving the entire sequence of input signal, the sum stored in the register 12 represent the sum of the input signals. The accumulator provides the contents of the register 12 as a signal on an output 14.

Serial accumulators suffer because they can only sum one input at a time. This negatively impacts the serial accumulator's applicability to many engineering problems. For example, in a computer the serial accumulator will seriously degrade data processing speed if it is used to sum a large number of input signals.

FIG. 2 shows a prior art parallel accumulator circuit. The parallel accumulator circuit comprises an adder tree 16 and a register 17. The adder tree 16 simultaneously receives a plurality of input signals on inputs 15 and in turn produces a sum which is then stored in register 17. The sum is represented by a signal on output 18. The adder tree 16 includes a plurality of adders which are connected together in a fashion which allows three or more input signals to be summed concurrently. When using the adder tree topology depicted by FIG. 2, N-1 adders are required to sum N inputs. For example, as shown in FIG. 2, eight input signals can be received simultaneously, thus, seven adder are required in the adder tree. If one wishes to sum a greater number input signals, then more adders are required. For instance, in order to sum sixty-four input signals, the adder tree would require sixty-three adders.

Although parallel accumulators are much faster than serial accumulators, parallel accumulator are at a disadvantage because they require a large number of adders, and hence, a large amount of space when implemented in an integrated circuit. This fact makes parallel accumulators impractical in many engineering applications.

There is thus a need for an accumulator circuit that is capable of summing concurrent input signals without requiring a large amount of area on an integrated circuit and without incurring a large processing delay.

BRIEF DESCRIPTION OF THE DRAWINGS

The invention is pointed out with particularity in the appended claims. However, other features of the invention will become more apparent and the invention will be best understood by referring to the following detailed description in conjunction with the accompanying drawings in which:

DETAILED DESCRIPTION OF THE PREFERRED EMBODIMENTS

It is an advantage of the present invention to provide an accumulator circuit which is capable of summing a large number of input signals, and yet requires substantially less space on an integrated circuit and less time to accumulate values than a conventional accumulator performing a similar function. A further advantage of the present invention is to provide an accumulator circuit which can be easily programmed to selectively accumulate any combination of input signals from different sources. Yet another advantage of the present invention is to provide an accumulator circuit that has a reduced input capacitance.

Generally, the present invention provides a method and accumulator for summing a plurality of input signals. The input signals may be construed as binary words representing numerical values. The accumulator itself comprises a plurality of summing circuits, a plurality of switches for regulating the transmission of data between the summing circuits, and a control unit for configuring the switches. The accumulator provided by the present invention can be more fully understood with reference to FIGS. 3–6.

Figure 3:
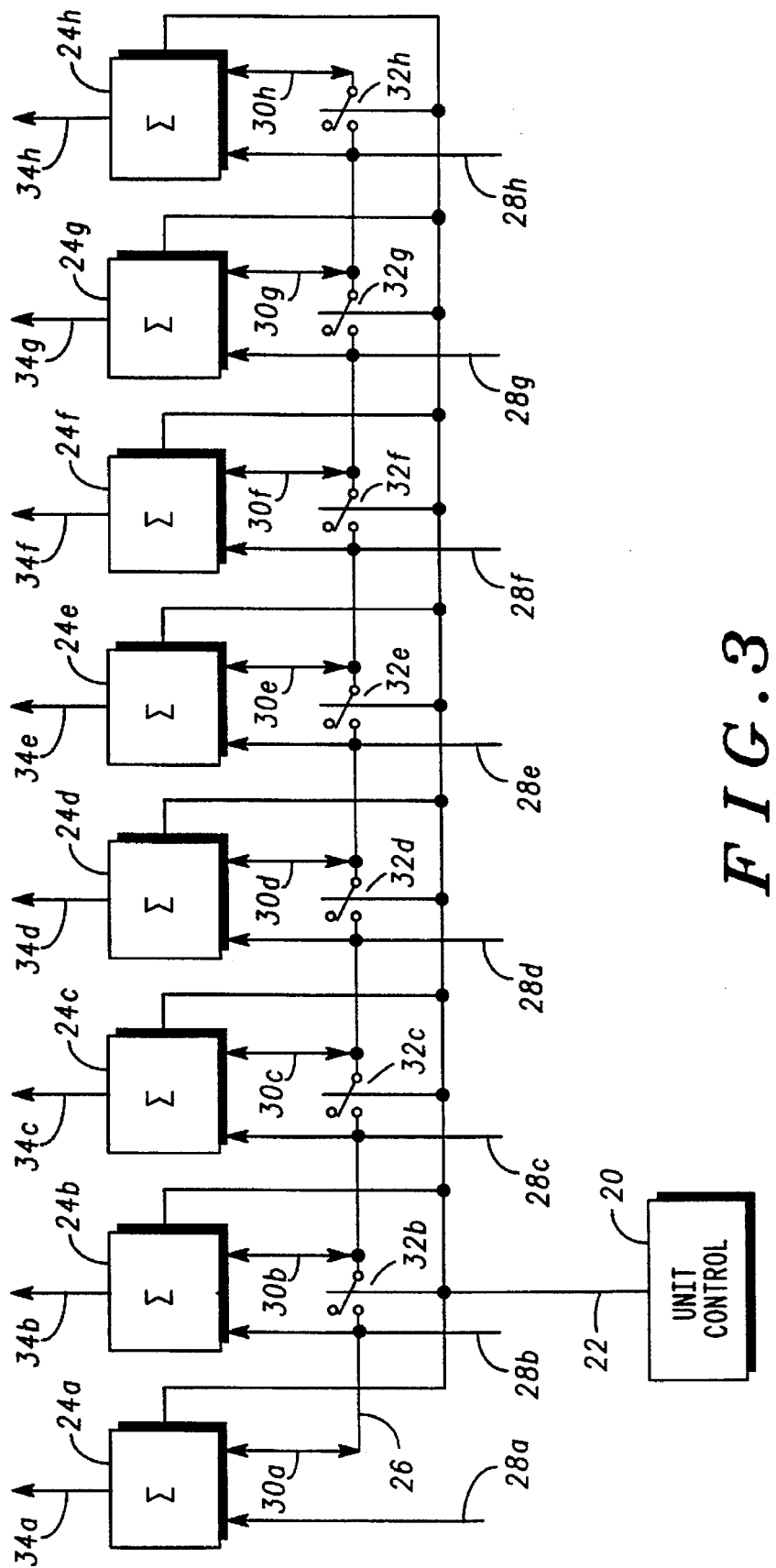
FIG. 3 illustrates a conceptual diagram of an accumulator which is in accordance with a preferred embodiment of the present invention.

FIG. 3 illustrates a conceptual diagram of an accumulator which is in accordance with a preferred embodiment of the present invention. The accumulator comprises a bus 26, a plurality of summing circuits 24$a$–$h$, a plurality of switches 32$b$–$h$, and a control unit 20 which is connected to each of the summing circuits by a control bus 22.

A significant advantage of the accumulator is that it can function as either a parallel accumulator or a plurality of serial accumulators. The actual function of the accumulator depends upon a sequence of control signals issued by the control unit 20.

The summing circuits 24$a$–$h$ are adjacently coupled to the bus 26. Each of the summing circuits 24$a$–$h$ has a bi-directional port 30$a$–$h$ and an input port 28$a$–$h$ connected to the bus 26. In addition, each summing circuit has an output port 34$a$–$h$. The summing circuits 24$a$–$h$ receive a plurality of input signals on the input ports 28$a$–$h$ and then sum the input signals to generate a plurality of intermediate signals. Each summing circuit 24$a$–$h$ can generate an intermediate signal on either its corresponding output port 34$a$–$h$ or bi-directional port 30$a$–$h$, depending on how the summing circuit is configured by the control unit 20.

The plurality of switches 32$b$–$h$ are for regulating the transmission of signals on the bus 26. Each switch is located on the bus 26 between the input port and the bi-directional port of a respective one of the summing circuits. In addition, each of the switches 32$b$–$h$ can be independently placed in either an open position or a closed position. In an open position, a switch will prevent signals from passing through to the remainder of the bus 26. In a closed position, a switch will allow signals to pass along the bus 26. For example, if an input signal is received on the input port 28$c$ of the third summation circuit 24$c$ while the first switch 32$b$ is closed and the second switch 32$c$ is open, then the input signal will be distributed across the bus 26 to the bi-directional ports 30$a$–$b$ of the first and second summing circuits 24$a$–$b$ and to the input ports 28$b$–$c$ of the second and third summing circuits 24$b$–$c$. The position of each switch is determined by a respective control signal issued by the control unit 20 and distributed across the control bus 22. In an integrated circuit, each switch can be implemented using a MOS (metal oxide semiconductor) pass transistor.

In addition to configuring each of the switches 32$b$–$h$, the control unit 20 configures the bi-directional port 30$a$–$h$ of each of the summing circuits 24$a$–$h$ to either receive or transmit data. At least one control signal for independently regulating the bi-directional port of each summing circuit is provided by the control unit 20 over the control bus 22. Each summing circuit includes a transceiver, which is responsive to the control signal, for setting the data flow direction of the bi-directional port. The details of the summing circuits are further described herein with reference to FIGS. 5 and 6.

By asserting various control signals at different times, the control unit 20 routes the intermediate signals to be either transmitted as output signals on the output ports 34$a$–$h$ or across the bus 26 to be received as input by another one of the of summing circuits 24$a$–$h$. For instance, to sum intermediate signals generated by the first summing circuit 24$a$ and the third summing circuit 24$c$, the control unit 20 first issues a control signal that opens the first and fourth switches 32$b$, $d$ and closes the second switch 32$c$. Then, the control unit 20 issues another control signal that causes the first and third summing circuits 24$a$, $c$ to place their intermediate signals on their respective bi-directional ports 30$a$,$c$. The second summing circuit then receives the intermediate sum of the first summing circuit 24$a$ on its input port 28$b$ and the intermediate sum of the third summing circuit 24$c$ on its bi-directional port 30$b$.

There are many approaches to realizing the control unit 20. In a digital system, the control unit 20 could be implemented as either a hard-wired control sequencer or a microprogrammable control unit. Generally, a hard-wired control sequencer is a sequential circuit realization of a finite state machine. A microprogrammable control unit, on the other hand, generates control signals by decoding a sequence of instructions that are stored in a memory. For instance, a microprocessor may be used to implement a microprogrammable control unit.

Although the accumulator of FIG. 3 is shown having a topology which includes eight summing circuits, one of ordinary skill in the art will realize that the accumulator may have any number of summing circuits, and yet still embody the concept and spirit of the present invention.

Operational Example of the Accumulator of FIG. 3

Two operational examples will be given for the accumulator: (1) parallel accumulation mode and (2) serial accumulation mode. Although only two modes of operations are presented here, many others are possible, as the control unit 20 can configure the accumulator to sum any combination of input signals.

The example for parallel accumulation demonstrates the accumulation of eight input signals into a single output sum. During parallel accumulation, the control unit 20 initially issues a control signal that causes all of the switches 32$b$–$h$ to open. Then, input signals are received, one on each of the input ports 28$a$–$h$. During the first addition cycle, the control unit 20 issues a control signal that causes every other summing circuit to generate an intermediate sum from the input signals. In other words, the first summing circuit 24$a$ sums the input signals received on the first pair of input ports 28$a$–$b$; the third summing circuit 24$c$ sums the input signals received on the second pair of input ports 28$c$–$d$; the fifth summing circuit 24$e$ sums the input signals received on the third pair of input ports 28$e$–$f$; and the seventh summing circuit 24$g$ sums the input signals received on the fourth pair of input ports 28$g$–$h$.

Next, during the second addition cycle, the four intermediate sums are added together to generate two further intermediate sums. The intermediate sums from the first and third summing circuits 24$a$,$c$ are summed by the second summing circuit 24$b$ to generate another intermediate sum. To accomplish this, the control unit 20 issues a control signal that opens the first and third switches 32$b$,$d$ and closes the second switch 32$c$. The control unit 20 then causes the first and third summing circuits 24$a$, $c$ to transmit their intermediate sums on their respective bi-directional ports 30$a$,$c$. Near this time, the control unit 20 also issues a control signal to cause the second summing circuit to receive signals on its bi-directional port 30$b$.

A like procedure as described above for the second addition cycle is also performed to sum the intermediate sums produced by the fifth and seventh summing circuits 24e,g. In this case, the control unit 20 opens the fifth switch 32f and closes the sixth switch 32g. The intermediate sums from the fifth and seventh summing circuits 24e,g are then transmitted across the bus 26 to the input port 28f and the bi-directional port 30f, respectively, of the sixth summing circuit 24f. As a result, the sixth summing circuit 34f generates a further intermediate sum.

During the third addition cycle, the intermediate sums generated by the second and sixth summing circuits 24b, f are summed to produce a final output sum. The control unit 20 asserts a control signal which opens the second switch 32c and closes the third, fourth, and fifth switches 32d–f. The control unit 20 then causes the intermediate sums of the second and sixth summing circuit 24b,f to be transferred across the bus 26 to the input port 28c and the bi-directional port 30c, respectively, of the third summing circuit 24c. The third summing circuit 34c sums these values and provides the result on its output port 34c. The value on the output port 34c is the final output sum generated by the accumulator.

When a summing circuit is inactive, i.e., it is not being used during an addition cycle, it's bi-directional port is held in a high impedance state, and further, it does not otherwise respond to signals traveling along the bus 26.

The example for serial accumulation demonstrates the accumulation of eight sequences of input signals into eight separate output sums. During serial accumulation, the control unit 20 initially issues a control signal that causes all switches 32b–h to remain open and all bi-directional ports 30a–h to assume a high impedance state. The sequences of input signals are received, one on each of the input ports 28a–h. Over time, each summing circuit sums it's respective input sequence to generate an output sum on it's corresponding output port 34a–h. These output sums form the output of the accumulator.

Figure 4:
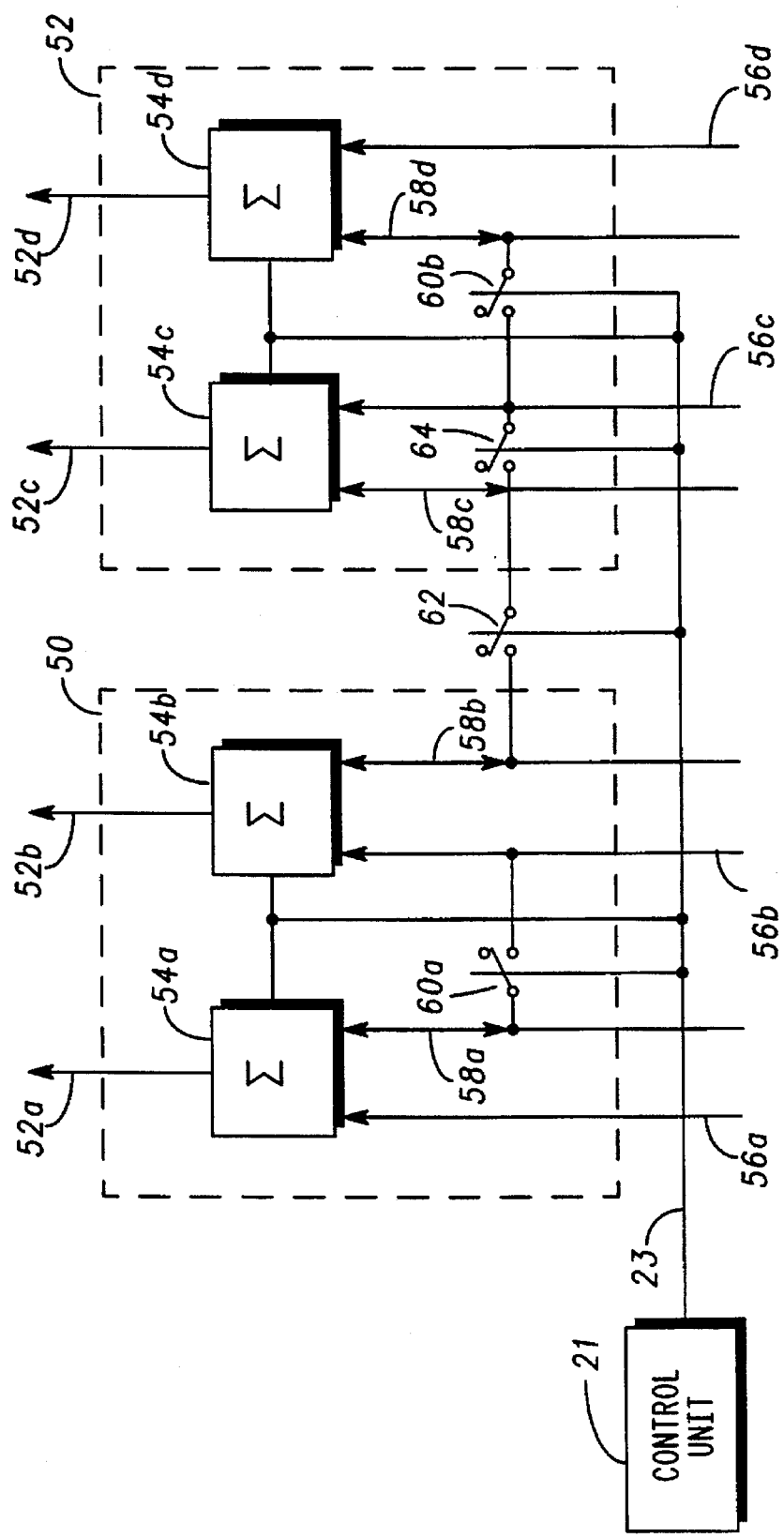
FIG. 4 illustrates a conceptual diagram of an accumulator which is accordance with another embodiment of the present invention.

FIG. 4 illustrates a conceptual diagram of an accumulator which is accordance with another embodiment of the present invention. The advantage of this version of the accumulator is that it can function as a parallel accumulator, but with significantly fewer adders than a conventional parallel accumulator. In the example shown in FIG. 4, the accumulator requires only four adders (one in each of the summing circuits 54a–d) to accumulate eight input signals; whereas, a conventional parallel accumulator would require seven adders for a like number of inputs. The accumulator can also function as a plurality of serial accumulators or a plurality of two-input adders.

The accumulator comprises a control unit 21, a plurality of switches 60a–b, a first center switch 62, a second center switch 64, and a plurality of summing circuits 54a–d. The summing circuits 54a–d are adjacently arranged into a first symmetrical group 50 and a second symmetrical group 52. Each of the symmetrical groups has a respective center summing circuit 54b–c.

In a diagrammatic sense, the symmetrical groups are mirror-images of one another. The first symmetrical groups includes a first center summing circuit 54b, while the second symmetrical group 52 includes a second center summing circuit 54c. The center summing circuits 54b–c are distinguished from others because they have their bi-directional ports 58b–c connected with the first center switch 62.

Each of the summing circuits 54a–d has an input port 56a–d and a bi-directional port 58a–d. In addition, each summing circuit has an output port 52a–d. The summing circuits 54a–d receive a plurality of input signals on both the input ports 56a–d and the bi-directional ports 58a–d and then sum the input signals to generate a plurality of intermediate signals. Each summing circuit 54a–d can generate an intermediate signal on either its corresponding output port 52a–d or bi-directional port 58a–d, depending on how the summing circuit is configured by the control unit 21.

The plurality of switches 60a–b are for regulating the transmission of signals between summing circuits within the same symmetrical group. Each of the plurality of switches 60a–b is connected between the bi-directional port and the input port of an adjacent summing circuits within a symmetrical group.

The first center switch 62 connects the bi-directional ports 58b–c of the center summing circuits 52b–c. The first center 62 switch allows intermediate signals to pass between the center summing circuits 54b–c.

The second center switch 64 can be located between the bi-directional and output ports of either the first or second center summing circuit. In the example shown, the second center switch 64 is connected between the bi-directional port 58c and the input port 56c of the second center summing circuit 54c. The purpose of the second center switch 64 is to allow intermediate signals produced on the bi-directional port 58b of the first center summing circuit 54b to reach the input port 56c of the second center summing circuit 54c.

Each of the switches can be independently placed in either an open position or a closed position. In an open position, a switch will prevent a signal from passing. In a closed position, a switch will allow a signal to pass. The position of each switch is determined by a respective control signal issued by the control unit 21 and distributed across the control bus 23. In an integrated circuit, each switch can be implemented using a MOS (metal oxide semiconductor) pass transistor.

In addition to configuring each of the switches, the control unit 21 configures the bi-directional port 58a–d of each of the summing circuits 54a–d to either receive or transmit signals. At least one control signal for independently regulating the bi-directional port of each summing circuit is provided by the control unit 21 over the control bus 23. Each summing circuit includes a transceiver, which is responsive to the control signal, for setting the data flow direction of the bi-directional port. The details of the summing circuits are further described herein with reference to FIGS. 5 and 6.

By asserting various control signals at different times, the control unit 21 routes the intermediate signals to be either transmitted as output signals on the output ports 52a–d or to other summing circuits 54a–d. For instance, to sum intermediate signals generated by the first summing circuit 54a and the first center summing circuit 54b, the control unit 21 first issues a control signal that opens the first center switch 62 and closes the switch 60a between the two summing circuits 54a–b. Then, the control unit 21 issues another control signal that causes the first summing circuit 54a to generate its intermediate signal on its bi-directional port 58a. The first center summing circuit 54b then receives the intermediate sum on its input port 56b and adds it to its own intermediate sum. The resultant sum generated by the first center summing circuit 54b can be output on either the bi-directional port 58b or the output port 52b.

In a digital system, the control unit 21 could be implemented as either a hard-wired control sequencer or a micro-programmable control unit.

Although the accumulator of FIG. 4 is shown having a topology which includes four summing circuits, one of ordinary skill in the art will realize that the accumulator may be have any number of summing circuits, and yet still embody the concept and spirit of the present invention.

Figure 5:
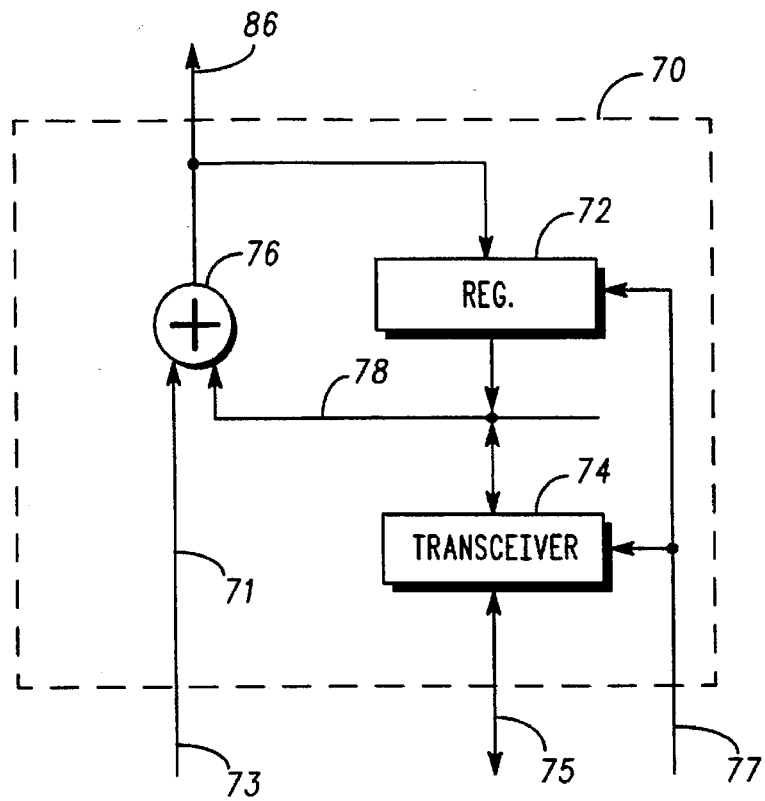
FIG. 5 illustrates a block diagram of a preferred summing circuit utilized by various embodiments of the present invention.

FIG. 5 illustrates a conceptual diagram of a preferred summing circuit 70 utilized by various embodiments of the present invention. The summing circuit 70 comprises an adder 76, a register 72, and a transceiver 74. The adder 76 has an input 71 connected to the input port 73 of the summing circuit 70 and another input 78 connected to the transceiver 74 and register 72. In response to receiving signals on its inputs, the adder 76 generates a sum, represented by an intermediate signal, which is provided to the register 72 and the output port 86. The register 72 stores and then provides the intermediate sum to the adder input 78 or the transceiver 74 at a later time. The register 72 performs its function according to control signals received on a control bus 77. The transceiver 74 either receives signals from the bi-directional port 75 or transmits the intermediate sum stored in the register 72 on the bi-directional port 75. Control signals received on the control bus 77 determine the action of the transceiver 74. In order to avoid indeterminate signals on the adder input 78, the register 72 and the transceiver 74 can have their respective outputs placed in a high-impedance state. In addition, the transceiver 74 can place its connection to the bi-directional port 75 in a high-impedance state.

Figure 6:
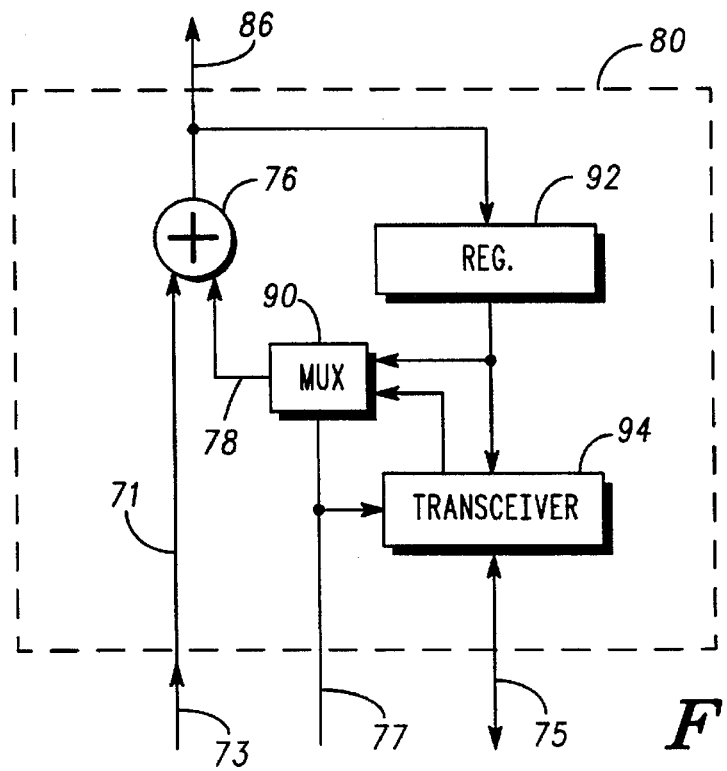
FIG. 6 illustrates a block diagram of another summing circuit utilized by various embodiments of the present invention.

FIG. 6 illustrates a conceptual diagram of another summing circuit utilized by various embodiments of the present invention. The summing circuit 80 comprises an adder 76, a multiplexer 90, a register 92, and a transceiver 94. The adder 76 has an input 71 connected to the input port 73 of the summing circuit 80 and another input 78 connected to the multiplexer 90. In response to receiving signals on its inputs, the adder 76 generates an intermediate sum, represented by an intermediate signal, which is provided to the register 92 and the output port 86. The register 92 stores and then provides the intermediate sum to the multiplexer 90 or the transceiver 94 at a later time. The transceiver 94 either receives signals from the bi-directional port 75 or transmits the intermediate sum stored in the register 92 to the bi-directional port 75. In addition, the transceiver 94 can place its connection to the bi-directional port 75 in a high-impedance state. Control signals received on the control bus 77 determine the action of the transceiver 94. The multiplexer 90 selectively provides either the register 92 output or the input signals from the bi-directional port 75 to the adder input 78. The output of the multiplexer 90 is selected by a control signal received on the control bus 77.

Figure 7:
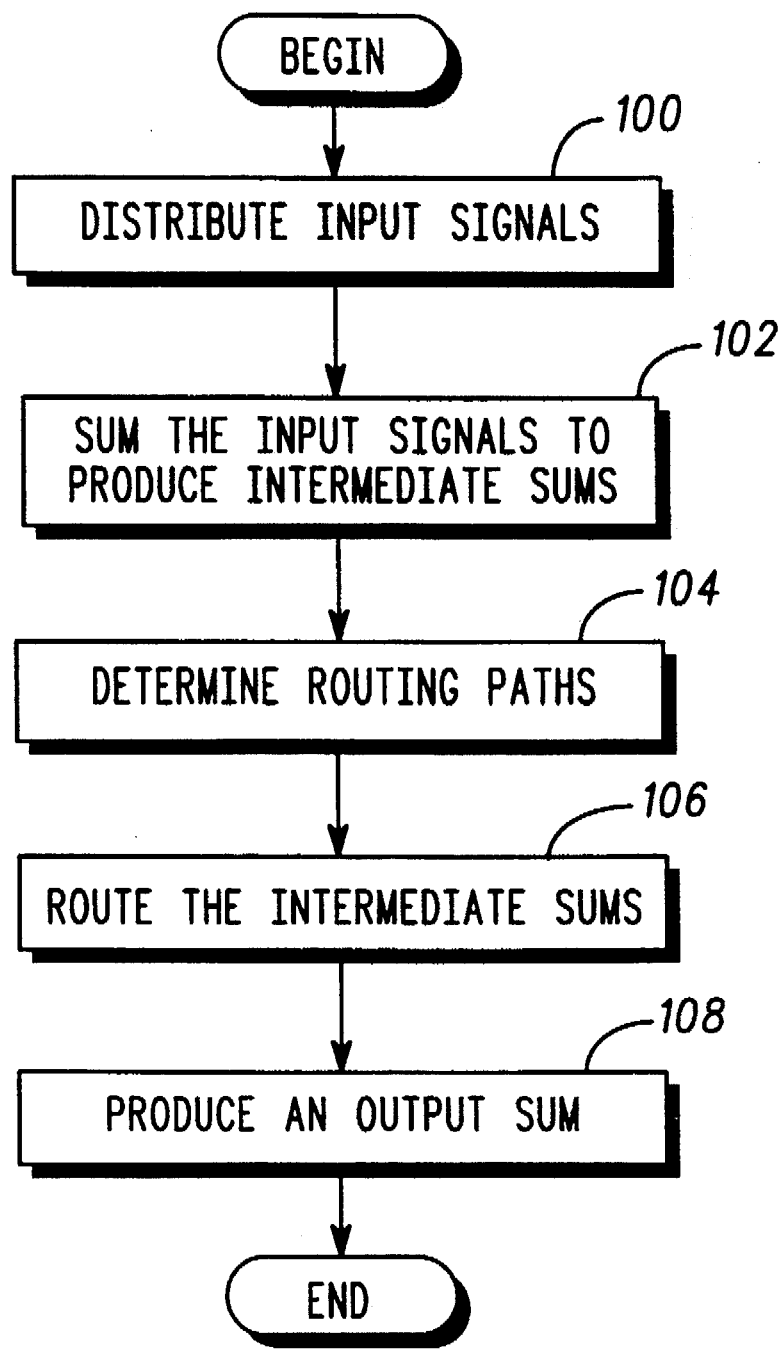
FIG. 7 illustrates a flow chart diagram of a method of using an accumulator, such as those depicted in FIGS. 3 and 4, in accordance with an embodiment of the present invention.

FIG. 7 illustrates a flow chart diagram of a method of using an accumulator, such as those depicted in FIGS. 3 and 4, in accordance with an embodiment of the present invention. In box 100, a plurality of input signals are distributed to the plurality of summing circuits. Next, in box 102, the summing circuits add together the input signals to produce a plurality of intermediate sums.

In box 104, a routing path is determined for each of the intermediate sums. The routing path indicates the flow of an intermediate signal, which represents the intermediate sum, through the accumulator. When combined together, the routing paths form a control sequence, which when executed by the control unit causes the accumulator to add together various ones of the intermediate sums to generate an output sum. The control unit can be programmed with routing path information to enable, at predetermined times, selected ones of the summing circuits and the switches. As a result of executing the control sequence, the control unit generates control signals which enable the switches and summing circuits so that the intermediate sums are accumulated as desired. Box 106 depicts the routing of at least one of the intermediate sums to an input of one of the summing circuits. The intermediate sums are routed by first enabling selected ones of the summing circuits to transmit, at specific times, an intermediate sum on their bi-directional port. Then, by setting the switches, the intermediate sums are transmitted to at least one other summing circuit. In box 108, the summing circuits sum signals received their inputs to produce an output signal which represents an output sum.

In reference to box 100, when the input signals are received on a common bus, such as in the accumulator depicted in FIG. 3, they are first matched to a corresponding summing circuit and then the switches are set accordingly so that the inputs remain isolated on different portions of the bus.

In reference to box 104, the control sequence is determined as follows. First, input signals to be included in the output sum are selected. Next, the summing circuits that produce intermediate sums from the input signals are designated. Then, final summing circuits which produce the output signals are designated. In the preferred embodiment of the present invention, the final summing circuits are selected so that the intermediate sums are transferable across a bus which connects the plurality of summing circuits. Finally, the times at which various switches and summing circuits are to be enabled are determined. The control sequence can be implemented using either microcode or a digital logic circuit.

Figure 8:
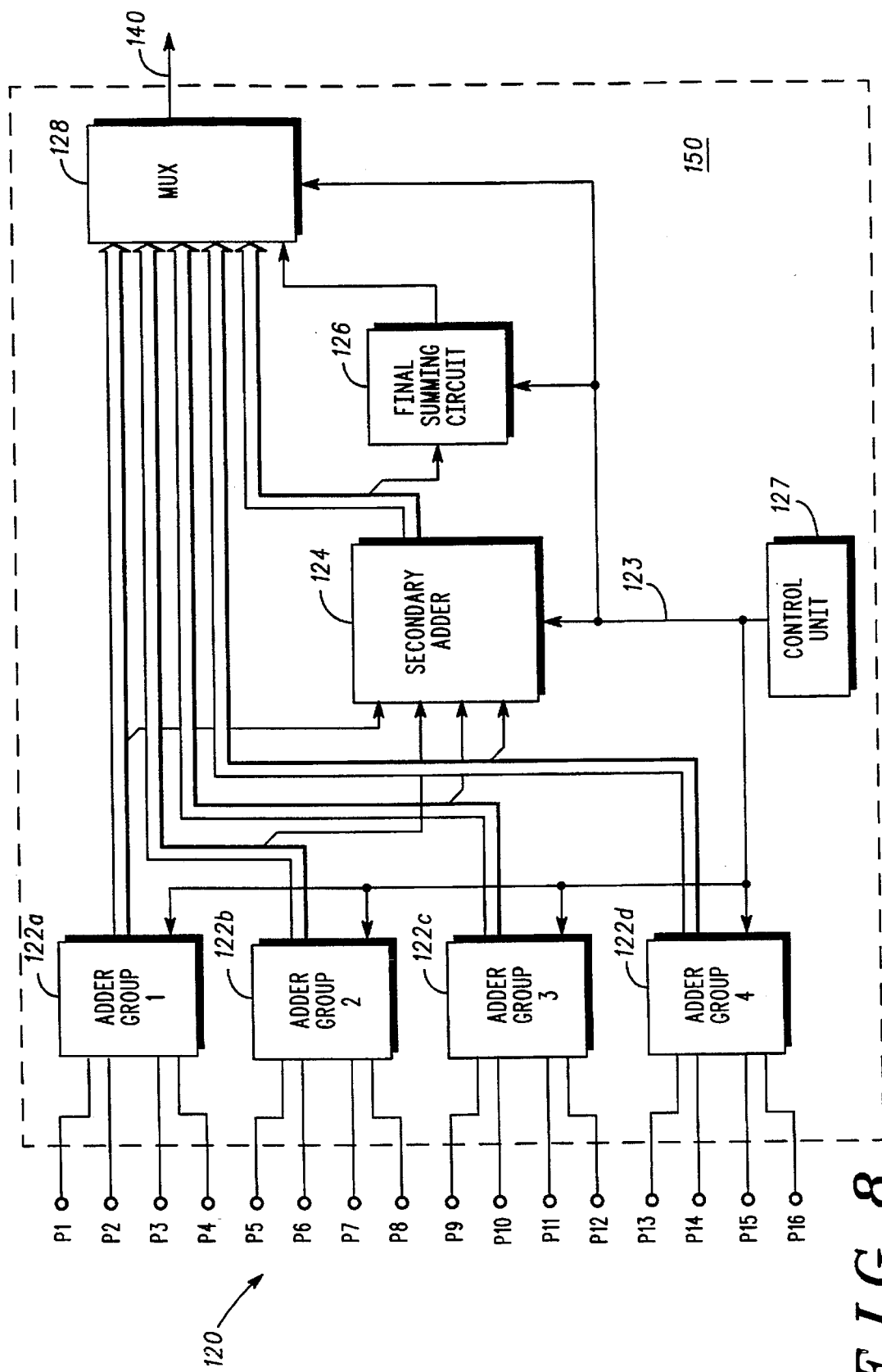
FIG. 8 illustrates a block diagram of a computer which incorporates the various embodiments of the present invention.

FIG. 8 illustrates a conceptual diagram of a computer which incorporates an embodiment of the present invention. The computer can generate at least one output sum on its output bus 140. The computer comprises a plurality of processors 120 and an accumulator 150. The accumulator 150 comprises a plurality of adder groups 122a–d, a secondary adder 124, a final summing circuit 126, a control unit 127, and a multiplexer 128. Although the plurality of processors may include any number of processors, they are represented by the sixteen depicted in FIG. 8. As a result of performing computations, the processors 120 generate a plurality of numerical values, which are represented by data signals. The adder groups 120a–d, in turn, sum the data signals to produce a plurality of primary sums, represented by primary signals. These primary signals are provided as input to both the secondary adder 124 and the multiplexer 128. Each adder group has a plurality of output ports; and although an adder group may have any number of output ports, in the example shown each adder group has four output ports. All of the output ports are connected to the multiplexer 128, while only one output port from each adder group is connected to the secondary adder 124. The secondary adder sums primary signals from each of the adder groups 122a–d to generate at least one secondary sum. The secondary sums are then provided to the final summing circuit 126 and the multiplexer 128. The final summing circuit 126 sums, over time, a sequence of secondary sums to produce a final sum. The final sum is provided to the multiplexer 128. The control unit 127 provides control signals to the adder groups 122a–d, the secondary adder 124, the final summing circuit 126, and the multiplexer 128 over a control bus 123. By issuing various control signals at different times, the control unit 127 can route, at a minimum, at least one secondary sum to the output bus 140 and configure each of the adder groups 122a–d to generate the at least one primary sum.

In one version of the computer, each of the adder groups 122a–d includes an accumulator based on the accumulator described herein with reference to FIG. 3. Because there are only sixteen processors depicted in FIG. 8, the accumulator shown in FIG. 3 would require only four summing circuits to be operable in one of the adder groups 122a–d. Using the accumulator of FIG. 3 as shown, having a total of eight summing circuits, would allow the computer to incorporate thirty-two processors rather than sixteen.

Figure 1:
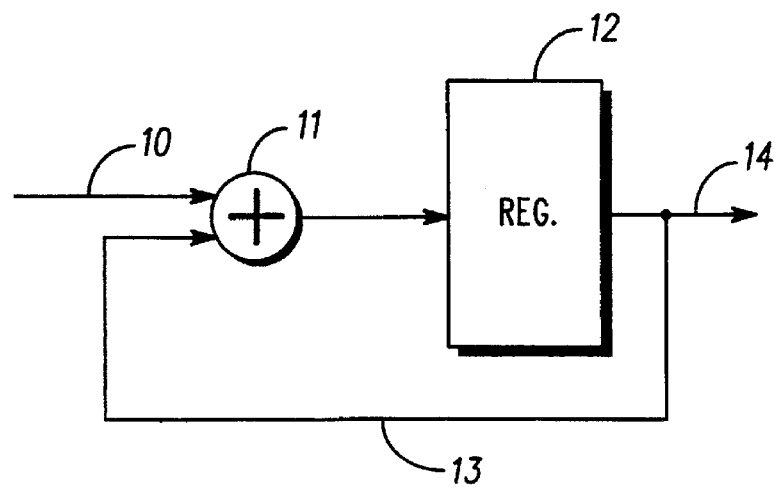
FIG. 1 shows a prior art serial accumulator circuit.
Figure 2:
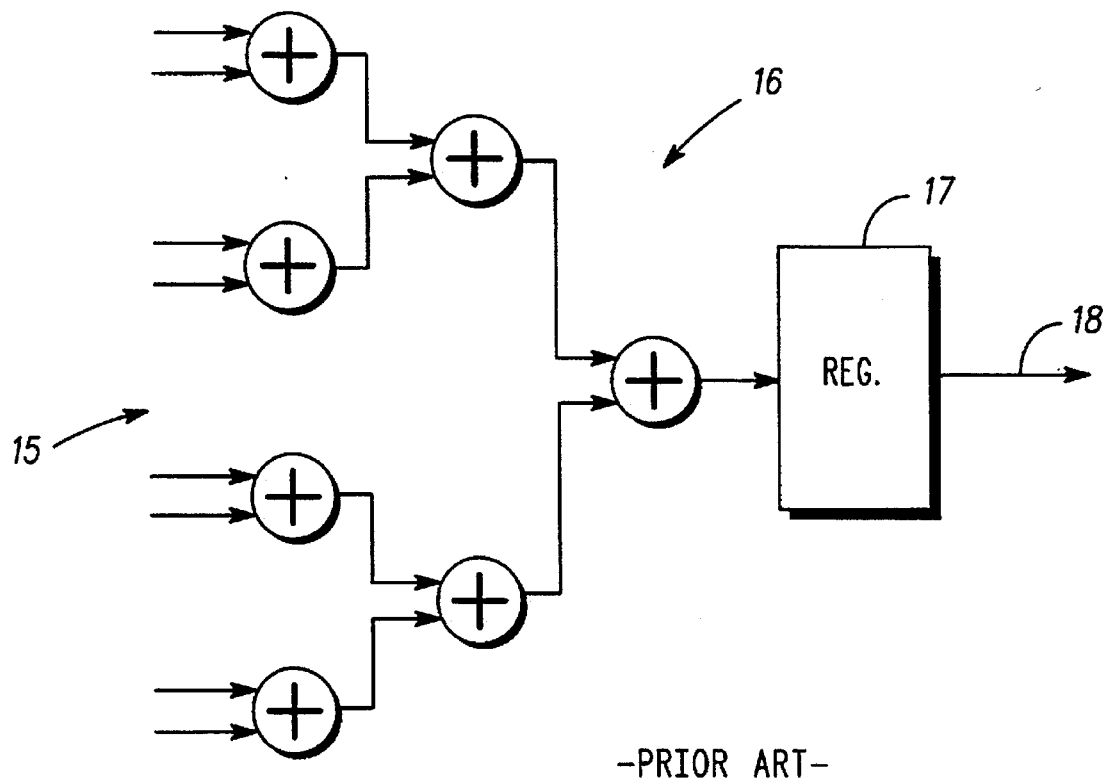
FIG. 2 shows a prior art parallel accumulator circuit.

In the same version of the computer, the secondary adder 124 includes an accumulator based on the accumulator described herein with reference to FIG. 4. To be operable in the secondary adder 124, the accumulator shown in FIG. 4 would require only two summing circuits. The final summing circuit 126 includes a serial accumulator as described herein with reference to FIG. 1.

The multiplexer 128 selects outputs from the adder groups 122a–d, secondary adder 124 or final summing circuit 126 to be provided on the computer output bus 140. The signals presented on the computer output bus 140 are determined according to a control sequence which is executed by the control unit 127.

The control unit 127 can configure the computer to accumulate any combination of the processors— 120 outputs. For example, the computer can be configured to individually accumulate the outputs of each of the processors 120 to generate a plurality of individual processor sums. These sums can then be sequentially provided on the computer output bus 140. This is accomplished by setting the adder groups 122a–d to function as a plurality of serial accumulators. The multiplexer 128 then sequential selects each of output of the adder groups 122a–d to be provided on the computer output 140. Another possible configuration allows all outputs of the processors 120 to be accumulated, over a period of time, into a single sum. This can be accomplished by the adder groups 122a–d summing the their respective inputs to generate primary sums. The primary sums are then summed by the secondary adder 124 to produce a secondary sum which represents the total of the processor outputs for a given addition cycle. The secondary sums for a plurality of addition cycle can then be accumulated, over time, by the final summing circuit 126 to generate the single sum. The output of the final summing circuit 126 is selected by the multiplexer to be provided on the computer output bus 140.

Thus, in summary, there has been described herein a concept, as well as several embodiments, including a preferred embodiment, of an accumulator which utilizes a plurality of switches and summing circuits to add input signals, thus allowing the accumulator to sum inputs at dramatically greater speeds while reducing the size and complexity of the accumulator in an integrated circuit.

Because the various embodiments of the present invention provide an accumulator circuit which includes a control unit, they can be easily programmed to selectively accumulate any combination of input signals from different sources. Additionally, because the various embodiments of the present invention provide a plurality of switches which can be open to isolate input signals, these embodiments enjoy a reduced input capacitance.

While specific embodiments of the present invention have been shown and described, it will be apparent to those skilled in the art that the disclosed invention may be modified in numerous ways and may assume many embodiments other than the preferred form specifically set out and described above.

Accordingly, it is intended by the appended claims to cover all modifications of the invention which fall within the true spirit and scope of the invention.

What is claimed is:

1. In an accumulator which includes a plurality of summing circuits, a method for producing an output signal representing a sum, the method comprising the steps of:

distributing a plurality of input signals to the plurality of summing circuits;

the plurality of summing circuits summing the plurality of input signals to produce a plurality of intermediate signals;

enabling the plurality of summing circuits to transmit the plurality of intermediate signals on a bus connecting the plurality Of summing circuits and a designated summing circuit;

routing the plurality of intermediate signals to the designated summing circuit by setting a plurality of switches coupled to the bus; and summing signals received by the designated summing circuit to produce the output signal.

2. The method of claim 1, further comprising the following step: programming a routing path for each of the plurality of intermediate signals, wherein the routing path includes at least one computer executable instruction which when executed allows each of the plurality of intermediate signals to arrive at the designated summing circuit at a determinate time.

3. The method of claim 1, further comprising the following steps:

selecting the designated summing circuit from the plurality of summing circuits.

4. The method of claim 1, further comprising the step of:

programming a control unit with a routing path to enable the summing circuits and set the switches.

5. An accumulator, which comprises:

a plurality of summing circuits for generating a plurality of intermediate signals, each of the plurality of summing circuits having a port for transferring signals;

a plurality of switches, connected between ports of the plurality of summing circuits, for regulating transmission of the signals, each of the plurality of switches having an open position and a closed position; and a control unit for configuring each of the plurality of switches in either the open position or the closed position and for configuring the port of each of the plurality of summing circuits to either receive or transmit data;

wherein a plurality of input signals is summable by the plurality of summing circuits to generate the plurality of intermediate signals, and the control unit routes ones of the plurality of intermediate signals to be transmitted as output signals or to at least one of the plurality of summing circuits by configuring the plurality of switches and the port of each of the plurality of summing circuits.

6. The accumulator of claim 5, wherein each of the plurality of summing circuits includes a bi-directional port and an input port.

7. The accumulator of claim 6, wherein each of the plurality of summing circuits comprises:

an adder for generating an intermediate signal, the adder having a first input responsive to the input port and a second input;

a register for storing the intermediate signal and providing the intermediate signal as a register output thereof;

a transceiver for receiving input data from the bi-directional port and transmitting the register output to the bi-directional port; and a multiplexer for selectively providing either the register output or the input data to the second input of the adder.

8. The accumulator of claim 5, wherein each of the summing circuits includes an output pore for transmitting at least one output signal.

9. The accumulator of claim 5, wherein the control unit is programmable to configure selected ones of the summing circuits and selected ones of the switches at predetermined times.

10. An accumulator, which comprises:

a bus;

a plurality of summing circuits, adjacently coupled to the bus, for generating a plurality of intermediate signals, each of the plurality of summing circuits having a bi-directional port and an input port connected to the bus;

a plurality of switches for regulating the transmission of data on the bus, each of the plurality of switches having an open, setting and a closed setting and being located on the bus between the input port and the bi-directional port of a corresponding one of the plurality of summing circuits; and a control unit for configuring each of the plurality of switches in the open setting or the closed setting and for configuring the bi-directional port of each of the plurality of summing circuits to receive or transmit data;

wherein a plurality of input signals is summable by the plurality of summing circuits to generate the plurality of intermediate signals, and the control unit routes ones of the plurality of intermediate signals to be either transmitted as output signals or across the bus to at least one of the plurality of summing circuits by configuring the plurality of switches and the bi-directional port of each of the plurality of summing circuits.

11. The accumulator of claim 10, further comprising:

an end summing circuit, located at one end of the bus, having only an input port connected to the bus and an output port for transmitting at least one output signal.

12. The accumulator of claim 10, wherein each of the plurality of summing circuits comprises:

an adder for generating an intermediate signal, the adder having a first input responsive to the input port and a second input;

a register for storing the intermediate signal and providing the intermediate signal as a register output thereof;

a transceiver for receiving input data from the bi-directional port and transmitting the register output to the bi-directional port; and a multiplexer for selectively providing either the register output or the input data to the second input of the adder.

13. The accumulator of claim 10, wherein each of the plurality of summing circuits includes an output port for transmitting at least one output signal.

14. The accumulator of claim 10, wherein the control unit is programmable to enable the bi-directional port of selected ones of the summing circuits and set selected ones of the switches at predetermined times.

15. An accumulator, which comprises:

a plurality of summing circuits adjacently arranged into two symmetrical groups, each of the symmetrical groups having a center summing circuit, and each summing circuit generating an intermediate signal and having an input port and a bi-directional port;

a first center switch connecting the bi-directional port of the center summing circuit of each group;

a second center switch connected between the bi-directional port and the input port of one of the center summing circuits;

a plurality of switches, each of the plurality of switches connected between the bi-directional port and the input port of adjacent summing circuits; and a control unit for configuring each of the plurality of switches, the first center switch, and the second center switch in an open setting or a closed setting and for configuring the bi-directional port of each of the plurality of summing circuits to receive or transmit data;

wherein a plurality of input signals is summable by the plurality of summing circuits to generate a plurality of intermediate signals, and the control unit routes ones of the plurality of intermediate signals to be either transmitted as output signals or to at least one other of the plurality of summing circuits by configuring the plurality of switches, the first center switch, the second center switch, and the bi-directional port of each of the plurality of summing circuits.

16. The accumulator of claim 15, wherein each of the plurality of summing circuits comprises:

an adder for generating the intermediate signal, the adder having a first input responsive to the input port and a second input;

a register for storing the intermediate signal and providing the intermediate signal as a register output thereof;

a transceiver for receiving input data from the bi-directional port and transmitting the register output to the bi-directional port; and a multiplexer for selectively providing either the register output or the input data to the second input of the adder.

17. The accumulator of claim 15, wherein each of the plurality of summing circuits includes an output port for transmitting at least one output signal.

18. The accumulator of claim 15, wherein the control unit is programmable to enable the bi-directional port of selected ones of the summing circuits and set selected ones of the switches at predetermined times.

19. An accumulator having an output bus, which comprises:

a plurality of adder groups for generating a plurality of primary sums in response to a plurality of input signals;

a secondary adder for generating a sequence of secondary sums in response to the plurality of primary sums;

a final summing circuit for summing the sequence of secondary sums to produce a final sum;

a multiplexer for selecting one of the final sum, the sequence of secondary sums, and the plurality of primary sums to be transmitted on the output bus; and a control unit for configuring the multiplexer and the plurality of adder groups.

20. The accumulator of claim 19, wherein the secondary adder comprises:

a plurality of summing circuits adjacently arranged into two symmetrical groups, each of the symmetrical groups having a center summing circuit, and each summing circuit generating a secondary sum and having an input port and a bi-directional port;

a first center switch connecting the bi-directional port of the center summing circuit of each group;

a second center switch connected between the bi-directional port and the input port of one of the center summing circuits;

a plurality of switches, each of the plurality of switches connected between the bi-directional port and the input port of adjacent summing circuits; and wherein the control unit configures each of the plurality of switches, the first center switch, and the second center switch in either an open setting or a closed setting, and the control unit configures the bi-directional port of each of the plurality of summing circuits to either receive or transmit data;

wherein the plurality of primary sums is summable by the plurality of summing circuits to generate a plurality of intermediate signals, and the control unit routes ones of the plurality of intermediate signals to be either transmitted as secondary sums or to at least one other of the plurality of summing circuits by configuring the plurality of switches, the first center switch, the second center switch, and the bi-directional port of each of the plurality of summing circuits.

21. The accumulator of claim 20, wherein each of the plurality of summing circuits comprises:

an adder for generating the plurality of intermediate signals, the adder having a first input responsive to the input port and a second input;

a register for storing the intermediate signals and providing each of the intermediate signals as a register output thereof;

a transceiver for receiving input data from the bi-directional port and transmitting the register output to the bi-directional port; and a multiplexer for selectively providing either the register output or the input data on the second input of the adder.

22. The accumulator of claim 19, wherein at least one of the plurality of adder groups comprises:

a bus;

a plurality of summing circuits, adjacently coupled to the bus, for generating a plurality of intermediate signals, each of the plurality of summing circuits having a bi-directional port and an input port connected to the bus; and a plurality of switches for regulating the transmission of data on the bus, each of the plurality of switches having an open setting and a closed setting and being located on the bus between the input port and the bi-directional port of a corresponding one of the plurality of summing circuits;

wherein the control unit configures each of the plurality of switches in either the open setting or the closed setting, and the control unit configures the bi-directional port of each of the plurality of summing circuits to either receive or transmit data;

wherein the plurality of input signals is summable by the plurality of summing circuits to generate the plurality of intermediate signals, and the control unit routes ones of the plurality of intermediate signals to either the output bus, the secondary adder, or across the bus to at least one other of the plurality of summing circuits by configuring the plurality of switches and the bi-directional port of each of the plurality of summing circuits.

23. The accumulator of claim 22, wherein each of the plurality of summing circuits comprises:

an adder for generating the plurality of intermediate signals, the adder having a first input responsive to the input port and a second input;

a register for storing the intermediate signals and providing each of the intermediate signals as a register output thereof;

a transceiver for receiving input data from the bi-directional port and transmitting the register output to the bi-directional port; and a multiplexer for selectively providing either the register output or the input data on the second input of the adder.

24. A computer having an output bus, which comprises:

a plurality of processors for generating a plurality of data signals as a result of performing computations;

a plurality of adder groups, operatively coupled to the plurality of processors, for summing the plurality of data signals to produce a plurality of primary sums;

a secondary adder for generating a sequence of secondary sums in response to the plurality of primary sums a final summing circuit for summing the sequence of secondary sums produce a final sum;

a multiplexer for selecting one of the final sum, the sequence of secondary sums, and the plurality of primary sums to be transmitted on the output bus; and a control unit for configuring the multiplexer and the plurality of adder groups.

25. The accumulator of claim 24, wherein the secondary adder comprises:

a plurality of summing circuits adjacently arranged into two symmetrical groups, each of the symmetrical groups having a center summing circuit, and each summing circuit generating a secondary sum and having an input port and a bi-directional port;

a first center switch connecting the bi-directional port of the center summing circuit of each group;

a second center switch connected between the bi-directional port and the input port of one of the center summing circuits;

a plurality of switches, each of the plurality of switches connected between the bi-directional port and the input port of adjacent summing circuits; and wherein the control unit configures each of the plurality of switches, the first center switch, and the second center switch in either an open setting or a closed setting, and the control unit configures the bi-directional port of each of the plurality of summing circuits to either receive or transmit data;

wherein the plurality of primary sums is summable by the plurality of summing circuits to generate a plurality of intermediate signals, and the control unit routes ones of the plurality of intermediate signals to be either transmitted as secondary sums or to at least one other of the plurality of summing circuits by configuring the plurality of switches, the first center switch, the second center switch, and the bi-directional port of each of the plurality of summing circuits.

26. The accumulator of claim 25, wherein each of the plurality of summing circuits comprises:

an adder for generating the plurality of intermediate signals, the adder having a first input responsive to the input port and a second input;

a register for storing the intermediate signals and providing each of the intermediate signals as a register output thereof;

a transceiver for receiving input data from the bi-directional port and transmitting the register output to the bi-directional port; and a multiplexer for selectively providing either the register output or the input data on the second input of the adder.

27. The accumulator of claim 25, wherein the control unit is programmable to enable the bi-directional port of selected ones of the plurality of summing circuits and set selected ones of the switches at predetermined times.

28. An accumulator, which comprises:

a plurality of summing circuits for summing a plurality of input signals to generate a plurality of intermediate signals, each of the plurality of summing circuits having a port for transferring data;

a plurality of switches, connected between ports of the plurality of summing circuits, for regulating transmission of the intermediate signals; and a control unit for configuring each of the plurality of switches in an open setting or a closed setting and for configuring the port of each of the plurality of summing circuits to receive or transmit data;

wherein the control unit routes the plurality of intermediate signals to be transmitted as a plurality of output signals or to at least one of the plurality of summing circuits by configuring the plurality of switches and the port of each of the plurality of summing circuits.

29. The accumulator of claim 28, wherein each of the summing circuits includes an output port for transmitting at least one the output signals.

30. The accumulator of claim 28, wherein each of the plurality of summing circuits includes a bi-directional port.

31. The accumulator of claim 30, wherein each of the plurality of summing circuits comprises:

an adder for generating an intermediate signal, the adder having a first input responsive to the input port and a second input;

a register for storing the intermediate signal and providing the intermediate signal as a register output thereof;

a transceiver for receiving input data from the bi-directional port and transmitting the register output to the bi-directional port; and a multiplexer for selectively providing either the register output or the input data to the second input of the adder.

* * * * *